United States Patent [19]

Pointer, Jr.

[11] 4,270,696

[45] Jun. 2, 1981

[54] DRIP IRRIGATOR FOR HANGING BASKETS

[76] Inventor: Odell Pointer, Jr., 1317 Finch St., Houston, Tex. 77009

[21] Appl. No.: 72,348

[22] Filed: Sep. 4, 1979

[51] Int. Cl.³ .............................................. A01G 9/02
[52] U.S. Cl. ........................................ 239/38; 47/67
[58] Field of Search ...................... 239/37, 38, 39, 40, 239/41, 42, 43, 57, 34, 32, 17, 20, 504, 99, 537, 540, 541, 569, 579, 562; 47/67, 71, 73, 79, 61

[56] References Cited

U.S. PATENT DOCUMENTS

| 1,063,395 | 6/1913 | Scribner | 47/79 X |
| 1,745,297 | 1/1930 | Harry | 239/504 |
| 3,930,334 | 1/1976 | Johnston | 239/20 X |
| 4,086,725 | 5/1978 | Li | 47/61 |
| 4,170,089 | 10/1979 | Smrt | 47/79 X |

FOREIGN PATENT DOCUMENTS

| 5603/27 | 1/1972 | Australia | 47/67 |
| 1141377 | 9/1957 | France | 47/61 |

Primary Examiner—Robert B. Reeves
Assistant Examiner—Gene A. Church
Attorney, Agent, or Firm—Roy H. Smith, Jr.

[57] ABSTRACT

Basic form is a conical reservoir, small end up and provided with a hook whereby the irrigator may be suspended from the same bracket used to support the hanging basket. A multiplicity of small openings downwardly through the base of the irrigator permits a slow dripping of a solution stored in the reservoir, and a larger opening at the top keeps atmospheric pressure on the top of the solution. In one refinement the base is provided with a number of downwardly extending channels to which the small openings may be limited. In another modification the distribution network is separated from the reservoir and is disposed just below it. The two parts are normally connected for flow by a plug connector which has a second or raised position wherein the flow passages are sealed to prevent any flow.

5 Claims, 7 Drawing Figures

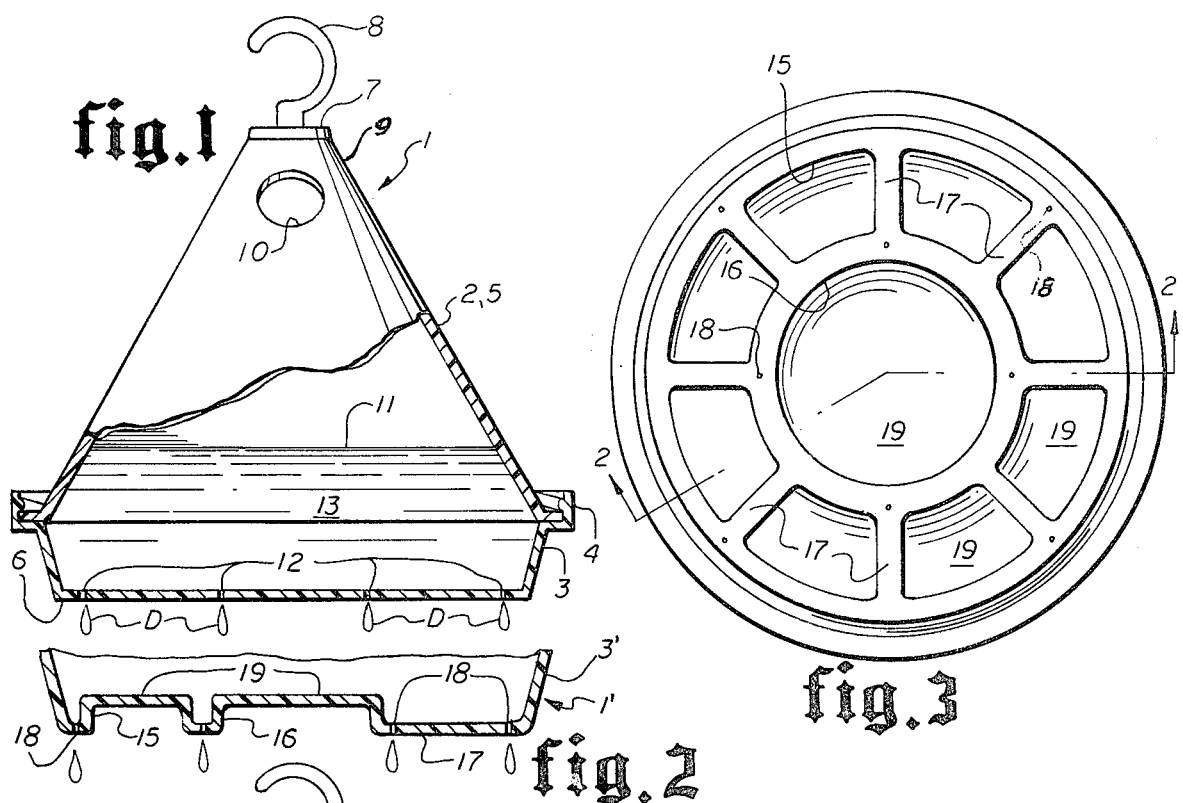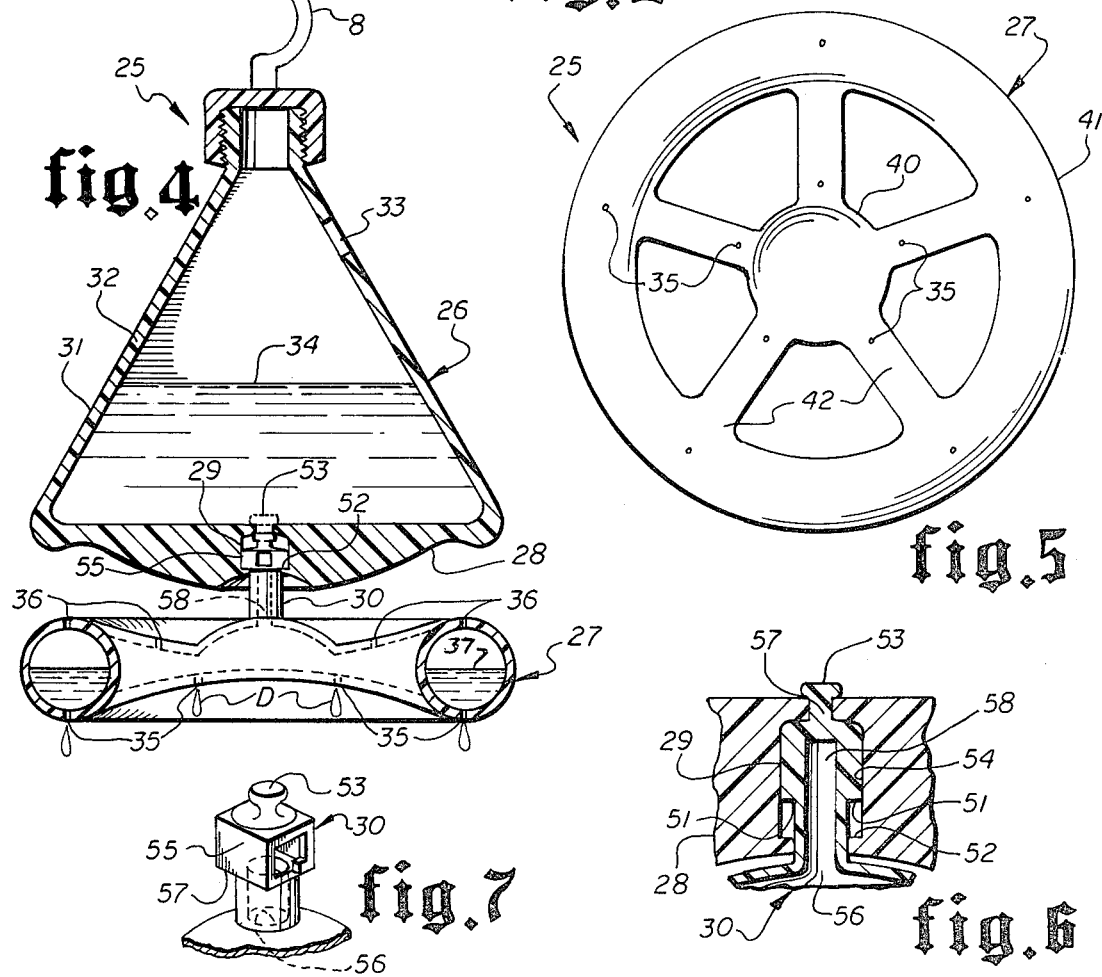

DRIP IRRIGATOR FOR HANGING BASKETS

BACKGROUND OF THE INVENTION

The present invention lies in the general field of watering devices for plants, and more particularly concerns the watering of plants held in baskets suspended from brackets. Typically, three or more wire cables or cords connected to equally spaced points around the periphery of the basket extend to a center point above the basket, where they are joined to a ring or hook.

The present inventor has noted that most plants grown in hanging baskets are still being watered by the traditional watering can. This is frequently unsatisfactory and messy, as water is often spilled and sometimes the user is so impatient that he fails to supply an adequate amount of water.

As a general rule, the recommended practice is to water most plants infrequently, but to thoroughly saturate the root system when doing any watering. This implies adding sufficient water (or solution, if the water includes soluble nutrient) to fill the pot or other container, but without overflowing it. Adding water by a can is all too likely to overflow the pot before the root system is saturated, so a technique for adding water at a slower rate and in a predetermined quantity is indicated. At the same time, the technique and equipment to implement it should preferably relieve the gardener from the tedium of an eyedropper approach. In commercial installations mist-fogging equipment, timers and clock-controlled valves can be used, but the present inventor is concerned more with the home gardener, for whom such elaborate apparatus is economically unfeasible.

PRIOR ART

The present inventor found something of a dearth of equipment suitable for his purposes, both in the commercial market and in the patent literature. The nearest art was found in the U.S. Pat. to Johnston, No. 3,930,334, although Johnston used his apparatus to create an aesthetic affect—a waterfall surrounding flora in a hanging basket—rather than for watering. Johnston discloses the use of a generally conical water container disposed above his plants, the open top container wall being provided with multiple openings so that water can pass through them and drip around the plants below in a preconceived pattern.

The Johnston apparatus is unsuitable for the present inventor's purposes for several reasons, primary among which is the fact that Johnston's conical container has its small end disposed lowermost. This not only creates a mounting problem (the broad surface can not be disposed at the conical outline formed by the wires or cords which support the basket), but assures an uneven distribution of the descending drops—because as the water level in Johnston's container falls, its diameter and surface decrease, exposing and rendering useless any drip openings in the outer parts of the conical wall; as the water level falls lower and lower, most of the drops fall on the center area below. Also, the open-top construction implies that the filling for Johnston's container would have to be added after the container is mounted in place; it would be courting disaster to attempt to fill the container and then mount it.

SUMMARY OF THE INVENTION

The present invention takes form in a drip irrigator having as its principal component a reservoir in the general form of a hollow conical shell, which may be pointed or slightly frusto-conical, although it may also have a disc portion below the cone, together with a hook means secured to the small end. This permits hanging the irrigator from the same hook used to support the basket to be served by the irrigator, and the conical shape of the irrigator makes it unneccessary to space it from the cone formed by the wires or cords of the basket.

In this basic form, the conical shell reservoir has a broad base, preferably circular and roughly the same size as the flower pot below. Such base may be flat, and is disposed to be approximately horizontal. It is provided with a number of small openings through which water or nutrient solution charged into the reservoir may drip to the plant below. A larger opening near the small upper end of the reservoir provides access for adding solution, and insures atmospheric pressure on the upper surface of the fluid at all times.

The drip openings are of sufficient size to ensure complete drainage of the reservoir, and they may be arranged in a pattern to provide uniform distribution of the solution on the plant below. While various materials may be used, the only requirement is that the structure be fairly rigid and light in weight. One preferred material is a clear polystyrene, as it meets such requirements and can be purchased and fabricated relatively inexpensively. A transparent type makes the irrigator unobtrusive, directing the beholder's attention to the plant itself.

In a minor modification to be described, the flat nature of the reservoir base is altered by depressions which form lowermost channels. These permit complete drainage of the reservoir even when the irrigator may be somewhat tilted by luxuriant plant growth, and the channels also serve to stiffen the base.

In another modification the reservoir has no drip openings but does have a single larger opening connected to a separate distribution network disposed below the base of the reservoir. Among other reasons for such separation is a flow control connection between reservoir and distributor. A plug connector is used which has a lower position and an upper position. In the lower position fluid in the reservoir flows freely into the distributor, but the upper position provides a seal of the plug to the reservoir, blocking all flow therefrom.

SHORT DESCRIPTION OF THE DRAWING FIGURES

The present invention may perhaps be more readily understood by reference to the drawing accompanying and forming a part of the present disclosure. In such drawing:

FIG. 1 is an elevation, partly in section, of the basic form of the irrigator of the present invention.

FIG. 2 is a partial section similar to the lower portion of FIG. 1, showing a modified base on such irrigator, taken along the lines labelled "2—2" in FIG. 3.

FIG. 3 is a bottom view of the irrigator of FIG. 2.

FIG. 4 is a sectional elevation of a modified form of irrigator, one in which the reservoir and distribution network are discrete but are interconnected.

FIG. 5 is a bottom view of the distributor network of FIG. 4.

FIG. 6 is an enlarged view of a portion of the irrigator of FIG. 4, showing the plug connector forming a part of the distributor network in its uppermost or sealing position.

FIG. 7 is a perspective view of the plug connector shown in FIGS. 4 and 6, separate and apart from the structural environment in which it works.

DETAILED DESCRIPTION OF A PREFERRED EMBODIMENT

The irrigator 1 shown in FIG. 1 is a one piece structure, incorporating both reservoir and distribution network, although for manufacturing purposes it may be made of an upper portion 2 and a lower portion 3 permanently secured together at the circumferential joint 4. It consists basically of the conical shell 5 extending downwardly with increasing diameter to a flat base 6. (The lower portion 3 may vary from the conical shape of upper part 2, as shown.) At its upper end, the shell 5 may be pointed or may terminate short of a point, with the frusto-conical surface 7. In either event, the upper end 9 is secured to a hook 8 by which the entire irrigator 1 is suspended and supported, preferably from the same bracket (not shown) which supports the hanging flower basket. It is to be understood that such a flower basket is typically supported by a number of wires or cords which run from its outer periphery to a central point above the basket, where all of the wires are connected to a single ring or hook, thus forming a generally conical envelope. The present irrigator is made conical in part so that it will nest within such conical outline of the supporting wires of the hanging basket, permitting the irrigator to be disposed well above the plants to be watered.

Adjacent to the upper end 9, the conical shell 5 is provided with a relatively large opening 10. This opening permits the filling of the reservoir-distributor whenever necessary, and it also ensures that the pressure of the ambient air will be exerted on the upper surface 11 of any liquid 13 within the reservoir. A multiplicity of considerably smaller openings 12 are formed through the flat bottom 6 of irrigator 1, and it is through these openings that drops of water or solution D pass and drip upon any plant disposed below the irrigator. Such multiplicity of small openings 12 are disposed in a pattern designed to ensure an even watering of such plant, and they are made in a size such that the droplets will be as close as possible to the minimum diameter possible without blocking flow through openings 12 as a result of such phenomena as surface tension and tension between the fluid and the material defining the openings 12.

FIGS. 2 and 3 illustrate an embodiment of an irrigator 1' similar to irrigator one of FIG. 1, differing therefrom in that the bottom portion 3' contains a number of downwardly depressed channels 15, 16, and 17. In the illustration, the multiplicity of small openings 18 for the passage of fluid are all disposed in the outer channel 15 and the inner channel 16, although they may be disposed also in the radial channels 17, and for that matter may be disposed in the nondepressed portions of the bottom 19. In the pattern shown, this position of the openings 18 ensures that all fluid will be drained from the irrigator at the end of the watering cycle, even though the structure may be slightly tilted as a result of a number of factors, e.g., upstanding vegetation, twisted cords on the baskets supports, etc. Again, the primary consideration in the whole dispersion pattern is an even watering of the plant below.

FIGS. 4 and 5 illustrate an embodiment 25 of the irrigator of the present invention in which the reservoir 26 and the distribution network 27 are discrete but interconnected parts. In this case, the base 28 of the reservoir has no small openings therethrough, but is provided with a relatively large single opening 29. This opening 29 accomodates a plug connector 30 upstanding from and integral with the distribution network 27, and always in fluid communication therewith (except as noted below). As in the previously described embodiment, the reservoir portion 26 of the irrigator consists basically of a conical shell 31 having its small end 32 disposed upwardly and secured to a hook 8, while its lower end 28 is basically flat and coextensive with the area to be watered below. Adjacent the small upper end 32 is a filler opening 33 which again ensures atmospheric pressure on the upper surface 34 of any solution within reservoir 26.

Although the distribution network 27 may have various shapes and configurations, it is basically a thick disc and may have exactly such configuration. In the particular embodiment illustrated, it is composed of a small center disc 40, an outer torus 41 and a number of hollow radial spokes 42, all of these members being constantly in fluid communication. A multiplicity of small openings 35 are provided through those portions of the walls of such components of the distributor to allow the gradual exudation therethrough of droplets D the of solution. In addition, it is preferred to add a number of upwardly extending openings 36, the better to ensure atmospheric pressure on the surfaces of the fluid within the components of the distributor, e.g., on the upper surface 37 of the liquid in the toroidal portion 41.

FIG. 4 shows the position of the distributor 27 when it is connected by plug connector 30 to reservoir 26 in such manner as to allow fluid to flow freely through the connector and into the center portion forty of the distributor. In such position, the lower shoulders 51 of the connector 30 rest on the lowermost shoulders 52 of the bottom opening 29, allowing fluid to flow past upper tip 53 of the plug, then between the flat sides of center portion 55 of the plug and the wall of opening 29, and finally into its hollow center 58, which is flow connected as shown to the interior 56 of the distributor 27, permitting flow at all times.

FIG. 6 illustrates the upper or sealing position of the plug connector and distributor. In this position, the round plug portion 53 at the tip of the connector has been pushed through the narrow neck 57 of the opening 29 (53 or 28 being made of resilient material such as rubber), and rests upon the upper orifice of this neck portion 57 to provide a seal therewith. It should also be noted at this point that the bottom portion 28 of the reservoir as well as the plug connector 30 may be made of resilient material, so that it is possible to completely and replaceably separate the plug connector from the bottom 28. This makes it possible to substitute a variety of combinations, i.e., reservoirs of different diameters with distributors of different diameters. Such facility makes it possible to fit the irrigator for use with flower pots of different diameters and networks of cords which support the hanging baskets of various diameters.

Having described and illustrated one or more preferred embodiments, it is to be understood that these are illustrative only, and that the present invention is to be construed strictly in accordance with the attached claims. Such claims are to be construed to cover all equilivant means for accomplishing substantially the same results in substantially the same manner.

What is claimed is:

1. A drip irrigator for a hanging basket plant container of the type adapted to be suspended from a hook or bracket and to hold aqueous solutions, said irrigator comprising a reservoir and a distributor disposed below the reservoir, said reservoir being of generally conical contour disposed with its small end upward and tapering downwardly to a broad bottom end having no openings therethrough other than a central opening which is flow connected to said distributor in a first position of the distributor, the distributor being disposed below and adjacent said reservoir and being in the general form of a relatively thick disc having lateral dimensions approximately the same as said bottom end of the reservoir, said distributor having a central connector portion extending upwardly into the central opening of the reservoir in sealing relationship therewith, said distributor also having a bottom or base containing a multiplicity of small openings therethrough for the dripping of liquids, such multiplicity of small openings being disposed over a broad circular area of said base whereby their exudations wet a like size circular area of a hanging basket below 2. The drip irrigator of claim 1 in which the central opening in the reservoir receives the central connector portion of the distributor in a second position when the distributor is raised above its flow connected first position, the connection portion in said second position sealing said central opening to prevent flow therethrough.

3. An irrigator for a hanging basket plant container of the type adapted to be suspended from a hook or bracket and to hold aqueous solutions,
said irrigator comprising an upper reservoir of generally conical contour disposed with its small end upward and its large end downward,
means attached to the upper end of the reservoir for suspending the irrigator from a bracket or hook, and a distribution network suspended below the reservoir and consisting of a multiplicity of conduits flow connected with one another and to the lower end of said reservoir, said conduits having a multiplicity of small openings to permit a gradual exudation of any aqueous solution flowing from said reservoir and through the conduits, said conduits and the small openings being disposed over a broad circular area whereby their exudations wet a like size circular area of a hanging basket below.

4. An irrigator as set forth in claim 3 in which said distribution network includes plug means adapted to be received in an opening in the lower end of said reservoir in one of two positions, a lower sealing position wherein said conduits are flow connected to the reservoir and an upper sealing position in which said plug forms a closure with the reservoir and prevents any flow.

5. An irrigator as set forth in claim 3 in which said distribution network includes a closed toroidal conduit generally coaxial with said reservoir and a multiplicity of circumferentially spaced radial conduits extending from said reservoir to the toroidal conduit.

* * * * *